United States Patent [19]

Wooten et al.

[11] Patent Number: 4,970,056
[45] Date of Patent: Nov. 13, 1990

[54] OZONE GENERATOR WITH IMPROVED DIELECTRIC AND METHOD OF MANUFACTURE

[75] Inventors: Robert D. Wooten, Rockville, Md.; John C. Egermeier, Vienna, Va.

[73] Assignee: Fusion Systems Corporation, Rockville, Md.

[21] Appl. No.: 298,077

[22] Filed: Jan. 18, 1989

[51] Int. Cl.⁵ .................. B01J 19/08; B01J 19/12
[52] U.S. Cl. ................ 422/186.07; 422/186.18; 422/186.19; 422/186.2; 422/907
[58] Field of Search .......... 422/186.07, 186.18, 422/186.19, 186.20, 186.22, 907

[56] References Cited

U.S. PATENT DOCUMENTS 3,607,709  9/1971  Rice .
3,996,474  12/1976  Lowther .
4,725,412  2/1988  Ito .................... 422/186.07
4,774,062  9/1988  Heinemann .......... 422/186.19
4,818,498  4/1989  Bachhofer et al. ..... 422/186.2

FOREIGN PATENT DOCUMENTS 103095   9/1976  Japan .............. 422/186.07
115004   7/1983  Japan .............. 422/186.07
260402  12/1985  Japan .............. 422/186.07
816342   7/1959  United Kingdom ... 422/186.15

Primary Examiner—John S. Maples
Assistant Examiner—Philip Tucker
Attorney, Agent, or Firm—Pollock, Vande Sande & Priddy

[57] ABSTRACT

An ozone generating cell which utilizes a quartz dielectric for providing high purity ozone. The quarts dielectric is cemented to one of the electrodes of the cell, and is then ground to a desired dimension.

2 Claims, 2 Drawing Sheets

OZONE GENERATOR WITH IMPROVED DIELECTRIC AND METHOD OF MANUFACTURE

The present invention is directed to an improved ozone generator and also to a method of making such ozone generator.

The art of ozone generating is old and well developed. Thus, in many parts of the world, the purification of water is accomplished by treatment with ozone rather than by the application of chlorine.

A common type of ozone generating cell is comprised of two conducting electrodes between which are sandwiched a dielectric layer and an air gap. Oxygen or an oxygen containing gas is passed through the air gap, and when a suitable high frequency A.C. voltage is applied across the electrodes, a corona discharge occurs in the air gap, which converts the oxygen flowing therethrough to ozone.

Ozone is also being used increasingly as a process gas in the manufacture of semiconductor devices. However, when the prior art ozone generators are applied to such semiconductor processing, a problem results. Specifically, the operation of the ozone generating cell causes atoms of material to be sputtered from the electrode(s) and to enter the ozone stream. Since the ozone contacts the semiconductor wafer during processing, ozone of the highest purity is required for semiconductor applications, and that which is even slightly contaminated cannot be used effectively.

Additionally, the concentration of the ozone which is required for semiconductor processing is considerably higher, perhaps twice that of the concentration which is necessary for water purification. In some generators of the prior art, the way to achieve higher ozone concentrations has been to increase the voltage which is applied to the cell. For example, some prior art ozone generators use power supplies which provide 60k voltage peak to peak. The disadvantages associated with such high voltage power supplies is that they tend to be very expensive, they are not as reliable as lower voltage power supplies, and they may result in excessive corona discharge occurring at parts of the cell which are outside of the air gap.

It is therefore an object of the present invention to provide an ozone generator which provides ozone of high purity.

It is a further object of the invention to provide an ozone generating cell which is capable of being operated at relatively low voltages to produce relatively high concentration ozone.

In accordance with the invention, the above objects are accomplished by providing an ozone generator which utilizes a dielectric layer which is made of quartz. It has been found that quartz is less prone to sputtering than the dielectric materials which are typically used in the prior art, and what small amount of sputtering does occur releases atoms of silicon into the ozone stream, which are far less inimical to the semiconductors being processed than the substances found to be released in greater quantities by other dielectric materials.

Additionally, the quartz dielectric is provided in a very thin layer of less than about 35 mils thickness and most preferably about 20 mils thickness. This allows lower supply voltages to be used while still generating ozone of relatively high concentration.

In accordance with an aspect of the invention, a method for fabricating a quartz dielectric layer of the necessary thinness is provided. Thus, commercially available techniques were not successful in providing a suitably thin quartz layer. In accordance with such techniques, one surface of a quartz sheet is adhered to a substrate with wax, while the other surface is ground down to the desired thinness, and after grinding, the quartz is removed from the substrate, typically by heating the wax. It was found however that when quartz sheets having a width dimension of six or seven inches were ground down beneath about 40 mils, when they were removed from the substrate, the ends curled up, making them useless as a dielectric layer.

In accordance with the invention, this problem is approached by first cementing the quartz layer to the cell electrode, and then grinding the layer down to the desired thinness. Since the quartz dielectric is never removed from the electrode, curling does not become a problem, and the remainder of the ozone generating cell is fabricated using the electrode/dielectric combination as a sub-assembly thereof.

The present invention will be better understood by referring to the accompanying drawings, in which.

Figure 1:
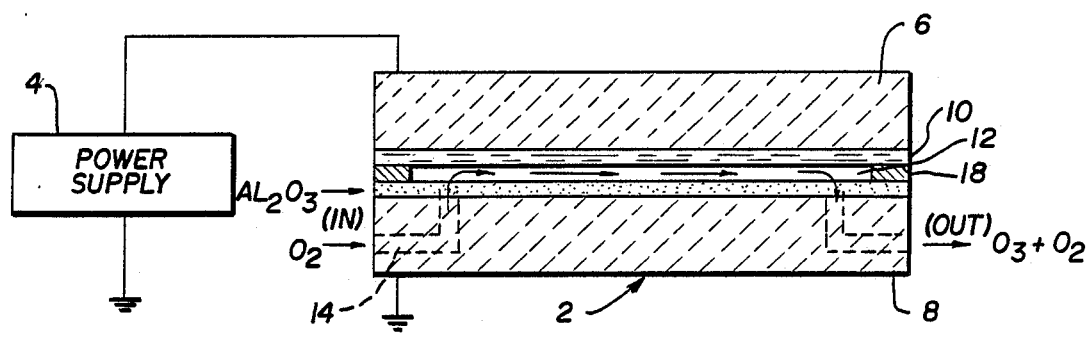
FIG. 1 is a cross-sectional view of an ozone generator in accordance with an embodiment of the invention.

Referring to FIG. 1, an ozone generator is depicted, which is comprised of ozone generating cell 2 and high voltage A.C. power supply 4.

The ozone generating cell is comprised of planar electrodes 6 and 8, between which are sandwiched a thin planar dielectric layer 10 as well as an air gap 12. Additionally, provision for cooling must be made, such as a duct passing through one or both electrodes through which cooling fluid is passed.

In the operation of the device, oxygen or a gas containing oxygen is fed into channel 14 which leads to air gap 12. The high voltage applied to electrodes 6 and 8 causes a corona discharge to occur in air gap 12, and in accordance with a well known reaction, the oxygen in the air gap is converted to ozone, or a combination of ozone and oxygen results.

In accordance with the present invention, the dielectric is made of quartz material, and preferably of synthetic quartz. The reason for this is that it has been found that the use of a quartz dielectric results in ozone of very high purity being produced.

As discussed above, with the dielectrics used in the prior art, which are predominantly glass, or ceramics, sputtering phenomena result in impurities entering the ozone stream. This occurs when the corona discharge causes atoms in the air gap to become ionized. The ions are accelerated towards the electrode by the high voltage applied to the electrodes, and upon impact cause atoms of the electrode to become dislodged, which then enter the process stream. This can occur also on bare metal electrodes which are commonly used as the grounded electrode.

Since glass is composed of silicon dioxide plus substantial amounts of impurities, and since the impurities generally have looser chemical bonds than the silicon dioxide, it is chiefly the impurities, for example, sodium, which are released into the ozone process stream. Since such impurities will ruin a semiconductor wafer if deposited thereon, an ozone generator which produces a process gas having such impurities cannot successfully be used for semiconductor processing.

On the other hand, it has been found that a quartz dielectric creates no such problems. The reason for this is believed to be that the composition of quartz is close to pure silicon dioxide, and while impurities do exist, they are present in extremely low concentrations of perhaps a few parts per million. Thus, when ionization occurs in the air gap during the operation of the ozone generator and the quartz is bombarded with the resulting particles, since the silicon dioxide has tightly bound atoms, there will be only a minimal release of such atoms into the process stream. Further, those atoms which are released are not as harmful as in the case of impurities, since the silicon and oxygen atoms are typically not incompatible with the devices on the semiconductor wafer being processed.

The quartz dielectric layer is made very thin, so as to allow the generation of high concentrations of ozone with relatively low applied voltages, and should be less than about 35 mils in thickness. More preferably, it is less than about 25 mils in thickness, and in the preferred embodiment of the invention, the quartz layer is about 20 mils thick, while the air gap is about 30 mils. As a practical matter, there is a lower limit on the thickness of the dielectric of 10-15 mils, as a thinner dielectric may not be able to withstand the voltages which are necessary to produce the desired ozone.

Referring again to FIG. 1, it is seen that the size of the air gap is controlled by the height of gasket 18, which separates electrode 8 from the dielectric layer.

Electrode 8, which in the embodiment depicted is the grounded electrode, is preferably made of aluminum. Further, this electrode has a layer of $Al_2O_3$ deposited thereon which protects the aluminum from becoming eroded during operation of the cell. It was noted that a prior art ozone generating cell using a grounded aluminum electrode but without a protective layer of $Al_2O_3$ developed a powdery deposit on the electrode after only a few dozen hours of use whereas there was no discernable change in the surface of electrode 8 of the cell shown in FIG. 1 after several hundred hours of use. Electrode 8 can also be protected in the same way as electrode 6, that is, using quartz.

Electrode 6, the high voltage electrode may also be made of aluminum, or alternatively may be made of another conductive metal such as copper or steel.

The power supply 4 produces high voltage A.C. at a high frequency. For example, in an actual embodiment which was built, the voltage used was 14 KV peak to peak at a frequency of 12 Khz. Due to the thin dielectric layer of about 20 mils, this relatively low voltage resulted in the production of ozone at 8% concentration. By way of comparison, typical prior art ozone generators for use in water purification use higher voltage to produce ozone at only 4% concentration at the same throughout.

In the above-mentioned actual embodiment, the electrodes were square and 6-7 inches on a side, the thickness of the air gap was 30 mils, the high voltage electrode was 1¼ inch thick and the grounded electrode was 1 inch thick, while the synthetic quartz used was Nippon Silica Glass OZ grade quartz or an equivalent.

As mentioned above, the thin quartz dielectric layer could not be fabricated with conventional techniques, and an aspect of the invention resides in a method for providing the thin quartz layer.

Figure 2:
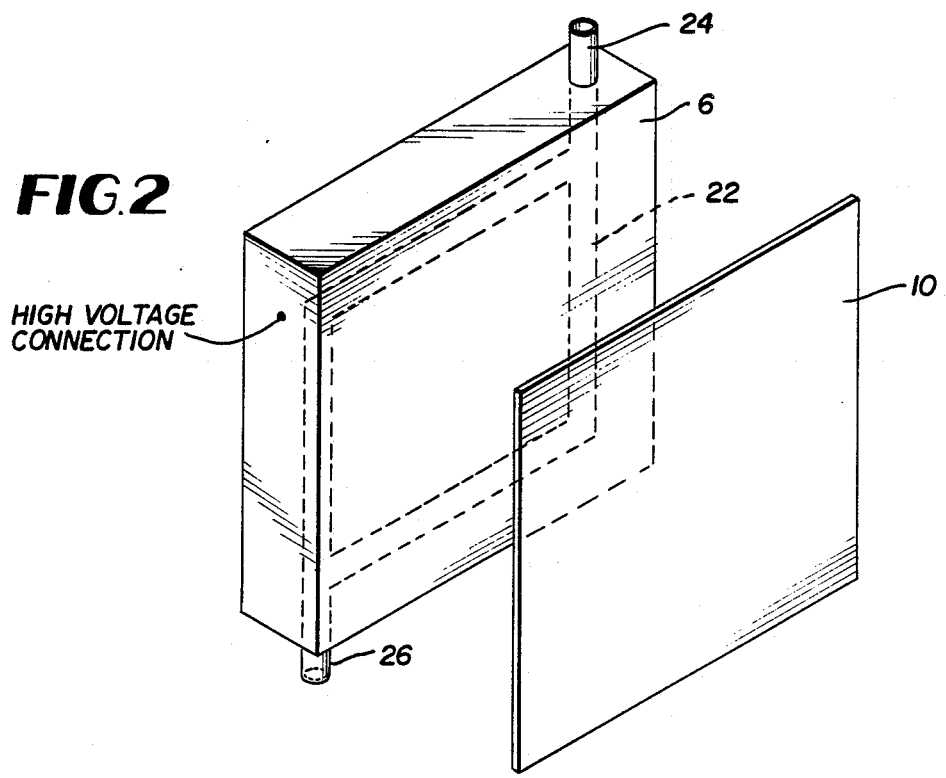
FIG. 2 is an exploded view of an electrode and associated quartz dielectric layer.

Referring to FIG. 2, electrode 6 and quartz sheet 10 are shown in exploded relationship. The electrode is depicted as being rectangular or square, although it is noted that its shape is arbitrary, and for example, could be circular. Additionally electrode 6 has cooling channel 22 bored therein, which is fed by in port 24 and which feeds into out port 26.

Quartz sheet 10 is the same shape and has the same or a slightly larger area than the surface of electrode 6, and is 62 mils thick, which is a commercially available thickness. In the preferred embodiment, the width dimension of the electrode and quartz overlay is at least 4 inches by 4 inches.

Figure 3:
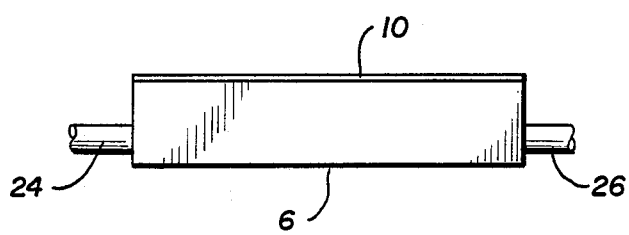
FIG. 3 shows the electrode dielectric sub-assembly after cementing of the dielectric to the electrode.

Referring next to FIG. 3, the quartz layer is cemented to the electrode by depositing a small amount of cement in the center of the electrode and by then pressing the quartz layer down on the electrode so that the cement, which is of relatively low viscosity, is pushed outwardly to cover the entire surface. The cement used is preferably UV curing cement, in which case immediately after application and pressing of the quartz layer onto the electrode, the assembly is moved under a UV lamp to effect curing of the cement. If desired, conventional epoxy cement may be used, but somewhat better results may be obtained with the UV curing type.

The electrode is heated to 45° C.±5° before application of the quartz, and until the cement has hardened. If pre-heating is omitted, then during operation of the cell, if the materials become warm, since the aluminum expands at a faster rate than the quartz, it will cause the quartz layer to crack. If the pre-heating step is performed as described, when the aluminum contracts upon cooling, this will place compressive stresses on the quartz, but since quartz is stronger in compression than it is in tension, no problem results.

Figure 4:
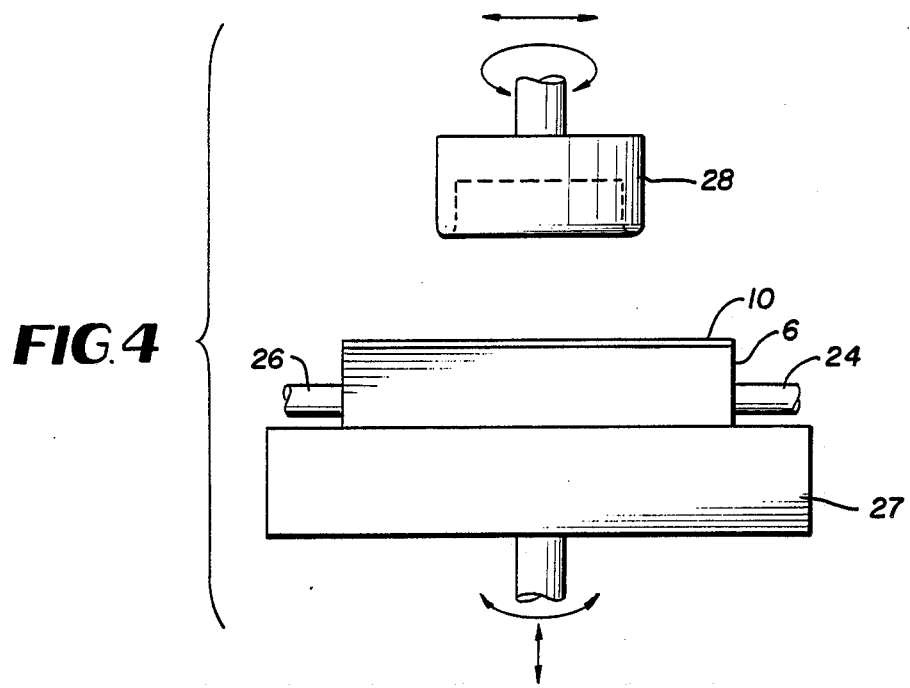
FIG. 4 shows the grinding of the quartz layer to a suitable thinness.

After cementing of the quartz layer to the electrode, the grinding of the quartz to its final thickness is effected, and this step is illustrated in FIG. 4. The precemented assembly is attached to table 27 of a conventional optical machining tool known as a curve generator, by for example, a vacuum chuck. The curve generator bit 28, which may be a diamond impregnated cup-shaped wheel is used to grind the quartz while rotating at several thousand RPM, and is moved back and forth in successive lines each displaced from the next across the surface of the quartz until the entire surface is covered. The generator table 27 may be rotated at, for example, several hundred RPM in the opposite direction from the bit while grinding takes place, and the table is moved upwardly until the quartz is ground to the desired thickness. After grinding, the surface of the quartz is polished smooth.

As mentioned above, with the method of the invention, it is possible to grind the quartz to a thickness of 20 mils and even thinner. This was not possible with conventional techniques wherein the quartz layer is temporarily secured to a substrate during grinding and then removed, as with such techniques with square quartz sheets 6-7 inches on a side, when ground thinner than 40 mils the edges of the sheet would curl up or "potato chip" upon removal from the substrate, rendering it useless as a dielectric.

While the illustrative embodiments herein show ozone generating cells using planar electrodes, it should be noted that other shapes, for example, cylindrical, are possible. In this case, a specialized grinding tool for reducing cylindrical surfaces would be used.

Figure 5:
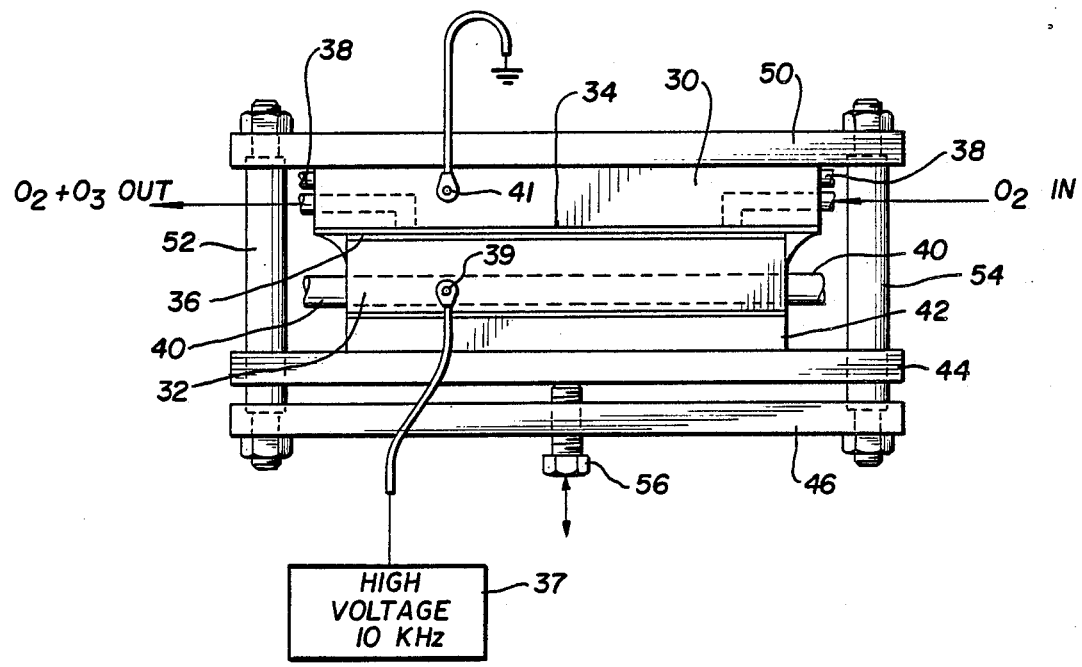
FIG. 5 is a pictorial illustration of an ozone generator assembly.

FIG. 5 shows an ozone generator assembly in accordance with the invention. The ozone generating cell is comprised of grounded electrode 30 and high voltage electrode 32, between which are sandwiched dielectric layer 34 and air gap 36. The cell is constructed as described above, and as seen has cooling ducts 38 and 40 in the respective electrodes, through which a refrigerated inert fluid is circulated. A.C. supply 37 is connected to connection terminal 39 of electrode 32 while connection terminal 41 on electrode 30 is grounded.

The grounded electrodes are made of anodized 1100 aluminum alloy. The high voltage electrode 32 sits on high voltage stand 42, and the cell is housed in a clamping assembly comprised of plates 44, 46, and 50, which are held together by four posts at the corners including posts 52 and 54 which are shown. The assembly is tightened by suitable adjustment of screw 56.

There thus has been described an improved ozone generator for providing ozone of high purity and high concentration. While this device is especially suited for providing process gas for use in the semiconductor industry, it also may be used for any other application where ozone is needed, for example, in water purification.

Finally, while particular embodiments of the invention have been disclosed herein for the purposes of illustration, it should be understood that variations will occur to those skilled in the art, and the invention is to be limited only by the claims appended hereto and equivalents.

We claim:

1. A corona discharge cell comprising,
    a first electrode having a given surface area,
    a thin, quartz dielectric layer of 30 mils thickness or less and having a surface area of more than twenty-five square inches cemented to said first electrode, said dielectric layer having been created by first cementing a quartz layer to said first electrode, and then grinding it down to said thickness of 30 mils or less, wherein said given surface area of said first electrode is about the same as the surface area of the dielectric, and
    a second electrode which is spaced from said dielectric layer by an air gap.

2. A corona discharge cell comprising,
    a first electrode having a given surface area,
    a thin, quartz dielectric layer of about 20 mils thickness and having a surface area of more than sixteen square inches cemented to said first electrode, said dielectric layer having been created by first cementing a quartz layer to said first electrode, and then grinding it down to said thickness of 20 mils, wherein said given surface area of said first electrode is about the same as the surface area of the dielectric, and
    a second electrode which is spaced from said dielectric layer by an air gap.

* * * * *